Dec. 31, 1968       C. E. MONNICH       3,419,039
DIAPHRAGM RELIEF VALVE
Filed Sept. 16, 1966
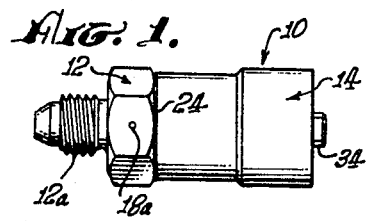
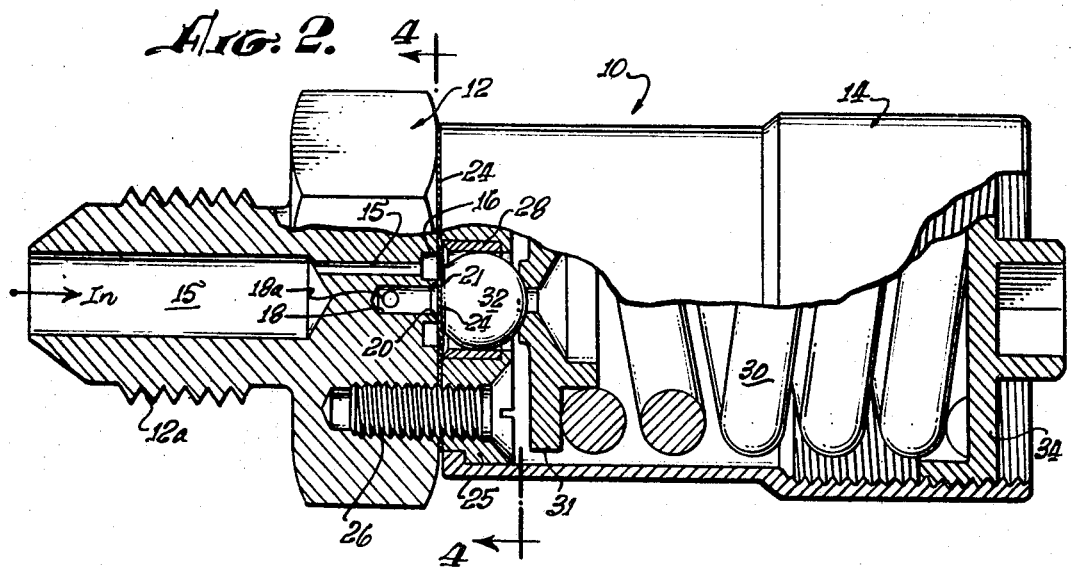
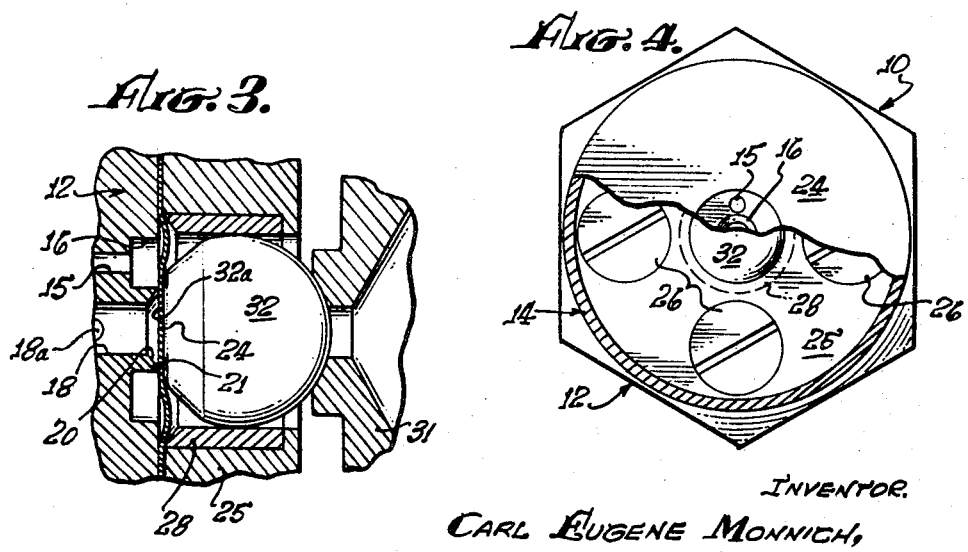
INVENTOR.
CARL EUGENE MONNICH,
By Knight & Rodgers
ATTORNEYS United States Patent Office 3,419,039
Patented Dec. 31, 1968

3,419,039
DIAPHRAGM RELIEF VALVE
Carl Eugene Monnich, Granada Hills, Calif., assignor to Sterer Engineering and Manufacturing Company, Los Angeles, Calif., a corporation of California
Filed Sept. 16, 1966, Ser. No. 580,089
2 Claims. (Cl. 137—510)

ABSTRACT OF THE DISCLOSURE

A high pressure relief valve has an annular valve seat around the inlet which is closed by contact with a metal diaphragm. Closing pressure from a spring is transmitted to the diaphragm by a novel arrangement which insures equalization of closing force and full seating of the diaphragm around the valve seat. All parts are metal, and the valve is adapted to operate at high pressures and high temperatures.

---

The present invention relates generally to valves, and more especially to relief valves which are designed to limit the maximum pressure within a fluid system.

Experience has indicated that in valves, dynamic seals, for example the familiar O-ring type of seal, are unsatisfactory in the presence of very high fluid pressures. These seals are generally made of some elastic or resilient material and are subject to deterioration, even under favorable conditions, and so become unable to hold the pressures involved. As a result, their performance can be unsatisfactory.

In the art, the term "high pressure" is generally used to designate fluid pressures in excess of 1,000 p.s.i. However, in current technology, pressures are often encountered greatly in excess of this lower limit, it being not unfrequent now to require equipment that operates reliably and repeatedly in the presence of fluid pressures in the range of 3,000 to 8,000 p.s.i. Under pressures of this magnitude, dynamic seals often do not hold because the pressures blow out the seals and consequently they are entirely unsatisfactory.

In a typical design of known relief valves, the pressure to be controlled is applied to the valve member over only a very small area. Typical of this construction is a spring-loaded ball which closes against a seat at the rim of a port; and the inlet pressure being controlled can be applied to the valve member only over the area of the port. The size of this area of the port constitutes a restriction upon the force available to open the valve; and this is especially true where the port is quite small.

Improved operation of the valve is obtained if the force closing the valve is considerably greater than is practical with known designs. Increasing the force closing the valve insures a better seal and gas-tight fit between the valve member and the seat; but an increase in closing pressure exerted by the spring cannot be utilized unless a correspondingly greater force can be generated by the controlled fluid pressure to open the valve at a preselected maximum pressure.

Accordingly, it is a general object of the present invention to provide a relief valve of novel design and improved operation that is especially suited to high pressure fluid systems.

More particularly, it is an object of the present invention to provide a relief valve which eliminates dynamic seals between moving parts.

Another object of the present invention is to provide a novel design for a relief valve that eliminates the restriction on the force opening the valve imposed by the area of the exhaust port.

These objects of the present invention are achieved in a relief valve by providing in the valve body separate fluid inlet and outlet passages which terminate, respectively, in an inlet port and an outlet port disposed at one side of a flexible diaphragm. The ports are preferably concentric with each other with an annular valve seat surrounding one of the ports and separating the two ports from each other. Means including a spring urges the diaphragm against the valve seat to a normally closed position preventing fluid flow between the ports, said means yielding in response to a predetermined fluid pressure at the inlet port to move the diaphragm away from the valve seat and allow fluid flow from the inlet to the outlet port. The means urging the diaphragm against the valve seat includes a pressure applying member bearing against the daiphragm over an area larger than the area within the valve seat, the pressure applying member having at one side a flat surface in engagement with the diaphragm and also preferably having at the opposite side a surface of uniform radius against which the spring pressure is applied, allowing the pressure applying member to shift with respect to the spring and to have self-aligning characteristics relative to the diaphragm.

How these and other objects of the invention not specifically mentioned herein are attained will be more readily understood by reference to the following description and to the annexed drawing, in which:

FIGURE 1 is a side elevation of a valve constructed according to the present invention;

FIGURE 2 is an enlarged longitudinal median section through the valve of FIGURE 1;

FIGURE 3 is a further enlarged fragmentary median section showing the valve seat, the diaphragm valve member, and the pressure applying member; and, FIGURE 4 is a transverse section on line 4—4 of FIGURE 2.

Referring now to the drawing, there is shown therein a relief valve indicated generally at 10 embodying the present invention. The valve comprises a body having two principal parts, a base 12 and a cap 14.

Base 12 has a threaded stem 12a by which the valve may be mounted on any desired piece of equipment in communication with a source of fluid under pressure. Extending longitudinally through the stem 12a is fluid inlet passage 15 which terminates at one end of the base in a shallow, annular groove cut into the end surface of the base and herein designated as inlet port 16. Centrally of the inlet port and surrounded thereby is an axially extending bore 18 which is the outlet fluid passage and which terminates at one end in outlet port 20. Outlet passage 18 includes one or more branch passages 18a which vent to the atmosphere. As may be seen in greater detail in FIGURE 3, the inlet port and the outlet port are separated by an annular valve seat 21 which may be formed by an integral portion of base 12. Valve seat 21 may be given a knife edge, if desired.

The valve member cooperating with seat 21 is flexible diaphragm 24 which is clamped around its periphery between the end face of base 12 and clamping ring 25 which is held in place by a plurality of machine screws 26 passing through the clamping ring and threaded into base 12. Clamping ring 25 is an annular member and the central bore in it has an undercut shoulder which engages and holds the guide ring 28. The guide ring is preferably provided at one end with a knife edge which bears against one face of diaphragm 24 in order to effect a fluid-tight seal between the diaphragm and the opposing end face of base 12.

When in firm contact with valve seat 12, diaphragm 24 shuts off communication between inlet port 16 and outlet port 20. The diaphragm is normally held in this closed position by means including the helical spring 30 which bears against follower 31 that transmits force from the spring to the pressure applying member 32. This latter member bears directly against the side of diaphragm 24 that is opposite the inlet and outlet ports and valve seat 21. As may be seen in FIGURE 3, the pressure applying member 32 has a flat surface 32a of a diameter larger than the diameter of the valve seat in order to press the diaphragm against the valve seat, the edge of which is in a plane. In this normal position of the diaphragm, no fluid can pass between the two ports. Around and beyond the flat area, the surface of the pressure applying member is relieved slightly to insure a concentration of the force on the valve seat. This relief is but a few degrees and extends out to the curved surface.

Pressure applying member 32 has a generally hemispherical surface of uniform curvature which bears against spring follower 31. This surface is chosen because thereby the force of the spring is always directed axially against the pressure applying member and the latter can shift angularly with respect to the spring in order to always align itself to bring its flat surface 32a against the diaphragm. The pressure applying member is confined laterally by a guide ring 28, previously mentioned. It is preferred that the surface of uniform curvature on the pressure applying member extend for more than 180° of arc so that the contact between the guide ring 28 and the pressure applying member is on this surface of uniform curvature, thereby allowing the member to shift angularly within the guide ring but still to be aligned with a valve seat 21. The inner wall of the guide ring is cylindrical so that the pressure applying member can move axially and slide on the guide ring during such axial movement.

The diameter of the cylindrical inner wall of guide 28 is substantially equal to the diameter of the hemispherical surface on member 32 so the center of curvature of the latter lies substantially on the axis of the cylindrical inner wall.

Spring 30 at its outer end bears against a fixed abutment 34 which is a plate preferably screw threaded into the outer end of cap 14 so that it can be adjusted in position to vary as desired, within limits, the force exerted by spring 30 against the diaphragm. This force, in turn, determines the fluid pressure existing at inlet port 16 at which the relief valve opens.

The total force developed by fluid pressure in opposition to spring 30 is equal to the unit pressure of the fluid multiplied by the area on diaphragm 24 over which that fluid pressure is exerted. In actual practice, this area may be somewhat greater than the area of inlet port 16 because the fluid pressure, if sufficiently great, may cause the diaphragm to bow or distort slightly at port 16, as indicated in FIGURE 3; but for purposes of description, it may be assumed that the fluid pressure is exerted on the diaphragm over the area of inlet port 16. This is because the relief on the pressure applying member is so slight that the diaphragm still contacts the ball outwardly of the truly flat area 32a as a consequence of the deformation of the diaphragm under fluid pressure on the opposite side thereof. It will be seen that this area, compared with the area of outlet port 18, is several times the latter. It is easily possible to design the valve so that the area of inlet port 16 is at least one order of magnitude greater than the area of port 18, that is, the area of port 16 is ten or more times the area of port 18. Thus, the designer is freed from the limitation imposed by the area of port 20 in known designs of valves as a limitation upon the force available to open the relief valve.

Increasing the force of spring 30 insures a firm seating of the diaphragm against annular valve seat 21 and makes it possible for the valve to repeatedly open and close with zero leakage past seat 21 after each cycle of operation.

It will be noted that this construction provides metal-to-metal contact with the diaphragm at all points. The diaphragm engages directly the annular valve seat at one side of the diaphragm and also directly engages both the end face of base 12 and the underside of ring 25. No elastic or dynamic seals are involved at any of these points.

Diaphragm 24 is a thin metal member having sufficient flexibility to be moved away from engagement with seat 21 by fluid pressure thereon. While any suitable materials may be used throughout the valve for its construction, it has been found that a highly suitable material is a copper beryllium alloy for diaphragm 24. This diaphragm can be made quite thin, typically .010" in order to secure the desired flexibility. The range of movement of the diaphragm is quite small in actual practice since, at the pressures contemplated, movement of the diaphragm of only a few thousandths of an inch away from seat 21 permits a sufficiently large volume of gas to escape to reduce the pressure in the system to the pre-established value. At the extremely high fluid pressures for which this valve is adapted, the total volume of fluid flow is relatively small; but the valve can be scaled up in size, and the diaphragm travel increased, if necessary, in order to obtain greater volume of fluid flow.

While it is preferred to have inlet port 16 of annular configuration surrounding but spaced from outlet port 20 in order to obtain the maximum value from the greater force that can be exerted thereby on the diaphragm to open the valve, it will be understood that it is also within the range of the invention to reverse the direction of fluid flow, if desired, and have port 20 the inlet port.

It will be apparent from the foregoing description that various changes in the detailed construction of the relief valve may occur to persons skilled in the art without departing from the spirit and scope of the present invention. Accordingly, it is to be understood that the foregoing description is considered to be illustrative of, rather than limitative upon, the invention as defined in the appended claims.

I claim:
1. A relief valve, comprising:
a body having an outlet passage terminating in an outlet port and an inlet passage terminating in an inlet port;
a valve seat between the outlet port and the inlet port;
a flexible diaphragm engaging the valve seat centrally of the diaphragm and movable toward and away from the valve seat to control fluid flow from the inlet port to the outlet port;
means urging the valve means to a normal position against the seat to close the outlet port to fluid flow and yielding in response to a predetermined fluid pressure on the valve means at the inlet port to open the outlet port including,
a resilient member;
a pressure applying member bearing against the diaphragm to transmit thereto force from the resilient member in a direction toward the seat, said pressure applying member having a flat area in contact with the diaphragm of a diameter greater than the diameter of the outlet port and having on the side opposite the flat area a surface of uniform radius to which force from the resilient member is applied;
and a guide for the pressure applying member slidably engaging the pressure applying member on the surface of uniform radius.
2. A relief valve, comprising:
a body having an outlet passage terminating in an outlet port and an inlet passage terminating in an inlet port;
a valve seat between the outlet port and the inlet port;
valve means movable toward and away from the valve seat to control fluid flow between the inlet port and the outlet port;
means urging the valve means to a normal position against the seat to close the outlet port to fluid flow and yielding in response to a predetermined fluid pressure on the valve means at the inlet port to open the outlet port including, a resilient member;

a pressure applying member interposed between the resilient member and the valve means to transmit force from the resilient member to the valve means in a direction toward the seat, said pressure applying member having on one side a flat area in contact with the valve means and also an outer surface of uniform radius on the side opposite the seat and to which force from the resilient member is applied;

and a fixed guide having a cylindrical guide surface surrounding and slidably engaging the pressure applying member on an outer surface of spherical shape having its center of curvature substantially on the axis of the cylindrical guide surface.

References Cited

UNITED STATES PATENTS

| | | | |
|---|---|---|---|
| 1,507,073 | 9/1924 | Lewis | 137—510 XR |
| 1,616,032 | 2/1927 | Ouffy | 137—510 |
| 1,863,075 | 6/1932 | Terry | 137—510 |
| 2,639,194 | 5/1953 | Wahlin | 137—510 XR |
| 2,686,533 | 8/1954 | Gratzmuller | 137—510 |

HAROLD W. WEAKLEY, *Primary Examiner.*

U.S. Cl. X.R.

251—333; 267—1